US012711874B2

(12) United States Patent
Aksenov et al.

(10) Patent No.: US 12,711,874 B2
(45) Date of Patent: Aug. 18, 2026

(54) SYSTEMS AND METHODS OF AUTOMATICALLY ADDING ACTIVE LISTENING MICRO-SCENARIOS DURING LEARNING SESSION

(71) Applicants: Constructor Technology AG, Schaffhausen (CH); Constructor Education and Research Genossenschaft, Schaffhausen (CH)

(72) Inventors: Sergey Aksenov, Belgrade (RS); Serg Bell, Costa del Sol (SG); Stanislav Protasov, Singapore (SG); Laurent Dedenis, Singapore (SG); Nikolay Dobrovolskiy, Istanbul (AR)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 247 days.

(21) Appl. No.: 18/745,284

(22) Filed: Jun. 17, 2024

(65) Prior Publication Data

US 2025/0384783 A1 Dec. 18, 2025

(51) Int. Cl.

| | |
|---|---|
| ***G06T 13/40*** | (2011.01) |
| ***G09B 5/06*** | (2006.01) |
| ***G11B 27/031*** | (2006.01) |

(52) U.S. Cl.
CPC .............. *G09B 5/065* (2013.01); *G06T 13/40* (2013.01); *G11B 27/031* (2013.01)

(58) Field of Classification Search
CPC ........ G09B 5/065; G06T 13/40; G11B 27/031
See application file for complete search history.

(56) References Cited

U.S. PATENT DOCUMENTS

| | | | | |
|---|---|---|---|---|
| 10,222,946 | B2 * | 3/2019 | Kitch | G09B 5/065 |
| 11,575,867 | B2 * | 2/2023 | Koch | G11B 27/031 |
| 11,877,032 | B2 * | 1/2024 | Stathacopoulos | H04N 21/8106 |
| 12,056,664 | B2 * | 8/2024 | Zionpour | G06F 16/958 |
| 12,432,400 | B2 * | 9/2025 | Tseng | G10L 15/1822 |
| 12,561,876 | B2 * | 2/2026 | Obukhov | G06F 40/284 |
| 2003/0037068 | A1 | 2/2003 | Thomas et al. | |
| 2011/0126106 | A1 * | 5/2011 | Ben Shaul | G11B 27/34 715/723 |
| 2025/0063239 | A1 * | 2/2025 | Gustman | H04N 21/8545 |
| 2025/0140291 | A1 * | 5/2025 | Deilamsalehy | G11B 27/031 |

FOREIGN PATENT DOCUMENTS

| | | |
|---|---|---|
| EP | 4239558 | 9/2023 |

* cited by examiner

*Primary Examiner* — Eddy Saint-Vil
(74) *Attorney, Agent, or Firm* — ESPE Legal Consultancy FZ-LLC

(57) ABSTRACT

Methods and systems for enhancing a student's comprehension of visually narrated lectures by automatically augmenting narration of textual lectures with automatically generated textual scenarios inserted into the lecture, including by automatically selecting the locations of the insertion, contents, voice, and avatar characteristics for the scenarios.

20 Claims, 3 Drawing Sheets

SYSTEMS AND METHODS OF AUTOMATICALLY ADDING ACTIVE LISTENING MICRO-SCENARIOS DURING LEARNING SESSION

TECHNICAL FIELD

The present disclosure generally relates to computer education and remote learning. Specifically, the disclosure relates to automatically augmenting narrated text-based lectures with automatically generated fragments.

BACKGROUND

Remote learning via computer education has become very popular. A large amount of educational material exists in the form of lectures saved as text. Modern systems allow for narration of text by automatically converting text to audio with certain voice characteristics.

In some cases, students that are presented with the narrated form of a lecture lose focus and concentration in the middle of monotonous narration. Therefore, methods and systems are needed to automatically add fragments to the narration of the lecture that bring the attention and focus of the students back to the lecture.

SUMMARY

The present disclosure relates to automatically augmenting a written lecture with interactive automatically generated scenarios and narration of the augmented lecture using one or more voice characteristics.

In an embodiment, the system comprises a neural network to identify the location where an automatically generated scenario will be inserted.

In an embodiment, the system comprises a neural network to identify the contents of the automatically generated scenario.

In an embodiment, the system comprises a neural network to identify the place where an automatically generated scenario will be inserted, as well as characteristics and contents of the automatically generated scenario to optimize the outcome of the narrated lecture, for example, based on the previously obtained data from students with similar characteristics in a form of test results or feedback from the students.

In one aspect, a method for augmenting a narrated lecture with narrated automatically generated textual scenarios comprises accessing a text of the lecture in computer memory or within one or more files located on a file storage; identifying n greater than 1 insertion locations IL(i) within the text of the lecture for i from 1 to n based on a predetermined insertion point identification criteria (PIPIC); for each i from 1 to n, using a predetermined automatically generated textual scenario generation criteria (PAGTSGC), determining a length of a textual fragment LTF(i) of a lecture preceding or following the IL(i) to generate an automatically generated textual scenario AGTS(i); performing the following operations, in any order: creating an empty video lecture file VLF in the computer memory or in a file system, for each i from 1 to n, using the GAGTS, generating m(i) 1 fragments, each fragment having a set of fragment parameters FP(i;j) comprising generated text, voice, and visual avatar characteristics, and saving the set of parameters FP(i;j) corresponding to AGTS(i) to an array of fragment parameters AFP(i) in the computer memory or file system, for each i from 1 to n, for each j from 1 to m(i), generating a video fragment VF(i;j) by using a narration of the text of the fragment F(i;j) with the voice and visual avatar characteristics of the fragment F(i;j) stored in the array of fragment parameters AFP(i) and concatenating the video fragments VF(i:j) for a given i and j from 1 to m(i) to form a video VAGTS(i) of the AGTS(i) and saving the VAGTS(i) in the computer memory or file system, concatenating VAGTS(1) to the VLF, for each i from 1 to n−1, creating a narrated video using a fragment of the lecture from the character number LI(i)+1 to LI(i+1) and the characteristics of audio and video avatar of a narrator of the lecture to create video lecture fragment VLF(i), and concatenating VLF(i) to the computer memory or file system, concatenating VAGTS(i) to the VLF, and creating a narrated video using a fragment of the lecture from the character number IL(N)+1 to a last character of the text of the lecture and the voice and video avatar characteristics of the narrator of the lecture to create video lecture fragment VLF(n) and concatenate VLF(n) to the VLF in the computer memory or file system; assigning the value of fragment VLF(0) to the narrated video of the lecture NVL(0); for each i from 1 to n, assigning the NVL(i) the value of concatenated NVL(i−1)+VN(i)+VLF(i); saving NVF(n) to the computer memory or file system as one or more files as the narrated video of the lecture NVL; and communicating the NVL to at least one operator at an computing device.

In one aspect, a method includes the predetermined insertion point identification criteria PIPIC being generated by training a machine learning model using a training set comprising a plurality of lectures and identified at least one insertion point within the lecture; and using the trained machine learning model to identify at least one insertion point within the lecture.

In one aspect, a method includes at least one insertion point identified by the machine learning model by evaluation of an effectiveness score of testing on the lecture.

In one aspect, a method includes the predetermined automatically generated textual scenario generation criteria PAGTSGC generated by training a machine learning model using a training set comprising a plurality of sets each comprising a lecture, an insertion location, and an inserted one automatically generated textual scenario AGTS separated into fragments and at least one set of audio characteristics and visual avatar characteristics for each fragment of the automatically generated textual scenario AGTS.

In one aspect, a method further comprises determining at least one IL within the text of the lecture by determining a logical pause in the text of the lecture denoted by a corresponding character or a set of characters.

In one aspect, a method includes at least one fragment of the automatically generated textual scenario AGTS comprising a text that is an agreeing phrase, either automatically generated based on a textual context or from a plurality of previously selected agreeing phrases, and voice and visual avatar characteristics different from voice and visual avatar characteristics of the narrator of the lecture.

In one aspect, a method includes at least one fragment of the automatically generated textual scenario AGTS comprising a text that is a rhetorical question generated based on a textual context or from a plurality of previously selected rhetorical questions, and voice and visual avatar characteristics different from voice and visual avatar characteristics of the narrator of the lecture.

In one aspect, a method includes generated text of the first fragment of the automatically generated textual scenario AGTS comprising a text that is a clarifying question generated based on a previous or following textual context with voice and visual avatar characteristics different from the voice and visual avatar characteristics of the narrator of the lecture followed by another fragment with characteristics comprising the text of the answer and voice and video avatar characteristics of the narrator of the lecture.

In one aspect, a method includes generated text of at least one fragment of the automatically generated textual scenario AGTS comprising a text comprising an incorrect summarizing of a fragment of the lecture and voice and visual avatar characteristics different from the voice and avatar characteristics of the narrator of the lecture, and another fragment of the same AGTS comprises a text that is a repetition the fragment that incorrectly summarized, and visual avatar characteristics of the narrator of the lecture.

In one aspect, a method further comprises generating a plurality of observations to optimize narration of the lecture, including: generating a version of the NVL with PIPIC and PAGTSGC values, showing the generated version of the NVL to at least one operator, assessing the effectiveness of showing the generated NVL to the at least one operator using an effectiveness score, saving the generated versions of PIPIC and PAGTSGC and the effectiveness score of showing the generated NVL, checking if a threshold number of tests have been performed and when the threshold number of tests have not been performed, changing at least one of the PIPIC or PAGTSGC and repeating the generating, showing, assessing, saving, and checking; using a mathematical linear optimization, selecting the values of PIPIC and PAGTSGC that maximize the effectiveness score; and generating a version of NVL using PIPIC and PAGTSGC using the selected values of PIPIC and PAGTSGC that maximize the effectiveness score.

In one aspect, a system for augmenting a narrated lecture with automatically generated narrated video fragments, comprises an electronic container configured to store a text of the lecture in computer memory or a file system; at least one processor and memory operably coupled to the at least one processor; instructions that, when executed by the at least one processor, cause the at least one processor to implement: an identifier of the insertion location (IIL) configured to access to the electronic container and to use a predetermined insertion point identification criteria (PIPIC) to identify at least one insertion location (IL) within the text of the lecture and to save the IL to the computer memory or file system; a generator of automatically generated textual scenarios (GAGTS) configured to access to the electronic container and the at least one IL and generate for each of the identified insertion locations IL, using a predetermined automatically generated textual scenario generation criteria (PAGTSGC), an automatically generated textual scenario AGTS, wherein each ATGS comprises at least one fragment with a corresponding textual fragment, voice characteristics, and visual avatar characteristics; a narration module (NM) configured to access the voice and visual avatar characteristics of all ATGS and to generate a narrated video of the lecture (NVL) using the voice and visual avatar characteristics, and further configured to: create an empty video lecture file VLF in the computer memory or in a file system, for each i from 1 to n, wherein n is the number of generated AGTS, for each j from 1 to m(i), generating a video fragment VF(i;j) by using a narration of the text of the fragment F(i;j) with the voice characteristics and the visual avatar characteristics of the fragment F(i;j) and store video fragment VF(i:j) in the computer memory or file system, for each i from 1 to n, concatenate video fragments VF(i:j) for each j from 1 to m(i) to form the video fragment VF(i) corresponding to AGTS(i) and store video fragment VF(i) in the computer memory or file system, create a narrated video using a fragment of lecture from a first character to the IL(1) and the voice and visual avatar characteristics of a narrator of the lecture to create video lecture fragment VLF(0) and save VLF(0) to the computer memory or file system, for each i from 1 to n−1 create a narrated video using a fragment of the lecture from from the character number LI(i)+1 to LI(i+1) and the voice characteristics and the visual avatar characteristics of the narrator of the lecture to create video lecture fragment VLF(i) and save VLF(i) to the computer memory or file system, create a narrated video using a fragment of the lecture from the character number IL(N)+1 to a last character of the text of the lecture and the voice characteristics and the visual avatar characteristics of the narrator of the lecture to create video lecture fragment VLF(n) and save VLF(n) to the computer memory or file system; assigning VLF(n) to the NVL; and an operator terminal configured to present the NFL to an operator.

DETAILED DESCRIPTION

The present disclosure relates to systems and methods for augmenting video narration of a textual lecture with inserted textual scenarios which are automatically generated using a set of pre-defined rules, wherein the lecture as well individual scenarios or their fragments are each narrated using a set of parameters comprising settings for voice and avatar of the narrator of the lecture or a narrator of the entire scenario or its fragment.

Figure 1A:
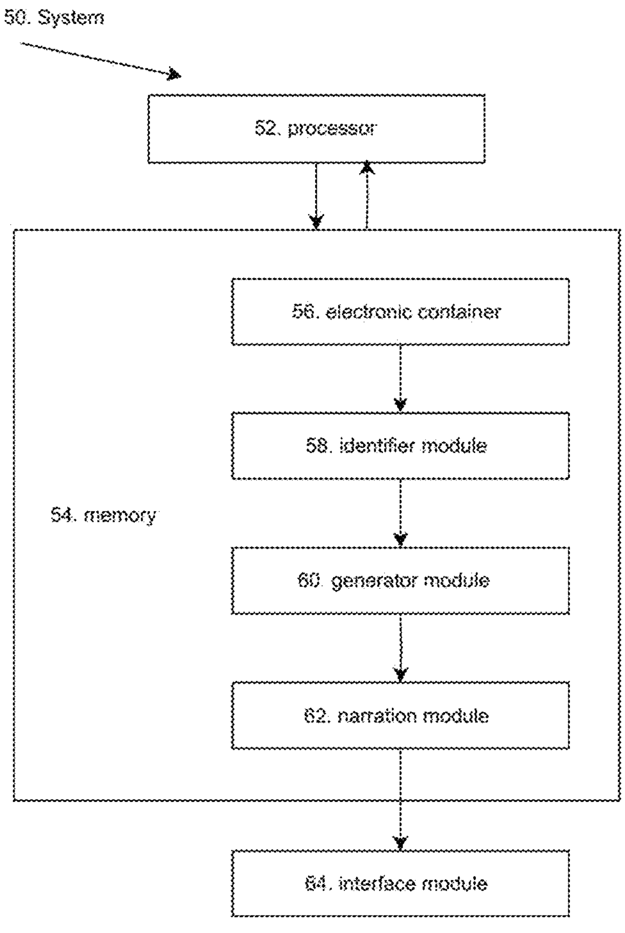
FIG. 1A is a block diagram of a system for augmenting a narrated lecture, in accordance with an embodiment.

Referring to FIG. 1A, a block diagram of a system 50 for augmenting a narrated lecture is depicted, in accordance with an embodiment. System 50 generally comprises at least one processor 52, memory 54 operably coupled to the at least one processor 52, and a plurality of engines or modules executable by at least one processor 52. In particular, memory 54 can include instructions that, when executed by at least one processor 52, cause at least one processor 52 to execute an electronic container 56, an identifier module 58, a generator module 60, a narration module 62, and an interface module 64.

Embodiments described herein include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

In an embodiment, electronic container 56 is a file or a fragment of computer memory that comprises a textual copy of the lecture that will be augmented. In an embodiment, identifier module 58 is configured to determine at least one insertion location IL within the textual copy of the lecture and save IL it to memory 54. In an embodiment, generator module 60 is configured to determine a type of the automatically generated textual scenario (AGTS). In an embodiment, narration module 62 is configured to create video fragments by narrating textual strings using specified voice and avatar characteristics. In an embodiment, interface module 64 is configured to provide an interface to one or more user devices. The components of system 50 will be further described with respect to FIG. 1B and FIG. 2.

Figure 1B:
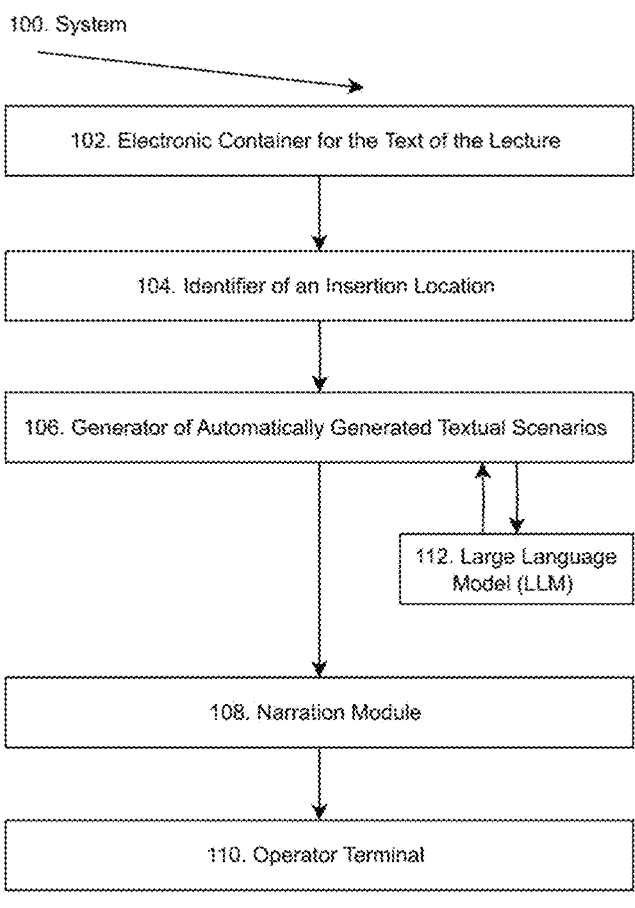
FIG. 1B is a functional block diagram of a system for augmenting a narrated lecture, in accordance with an embodiment.

Referring to FIG. 1B, a functional block diagram of a system 100 for augmenting a narrated lecture is depicted, in accordance with an embodiment. System 100 generally comprises components substantially similar to system 50, but which are renumbered here for ease of explanation.

Electronic container 102 is a file or a fragment of computer memory that comprises a textual copy of the lecture that will be augmented. In an embodiment, electronic container 102 is substantially similar to electronic container 56.

In an embodiment, the electronic container 102 also contains parameters describing the voice and avatar characteristics of the narrator of the lecture. Voice and avatar characteristics can include an index number of a voice in a preselected array or a collection of voices and the number of the avatar in the preselected array or a collection of avatars, wherein a collection is a group of values of a single data type, each value in the collection is referred to as an element, and wherein an array is a collection of objects with a unique index assigned to each element of the collection. Musical practice has recognized six basic voice types that can be used as voice characteristics: bass, baritone, tenor, contralto, mezzo-soprano, and soprano. Additional characteristics of voice are phonation, pitch, loudness, and rate. These characteristics can be used to generate a given voice. Avatar characteristics can include clothes, the shape of the face, color of the eyes, hair style, facial hair, dynamics of the face when a word is pronounced, or the way the face changes based on the type of the sentence, for example, a question or a statement.

In another embodiment, parameters describing the voice and avatar characteristics of the narrator of the lecture are determined using a trained neural network. The neural network is trained on a set of vectors, each vector containing a textual fragment and voice and avatar characteristics of the corresponding narrator of the lecture from a pre-selected training set of such vectors.

Identifier of an Insertion Location 104 is configured to determine at least one insertion location IL within the text of the lecture and save the location to computer memory. In an embodiment, the Identifier of an Insertion Location 104 is implemented as part of identifier module 58. In an embodiment, the identifier of the insertion location (IIL) is the number of the character (e.g. in sequence) in the textual representation of the lecture after which the automatically generated text will be inserted. In another embodiment, the identifier of the insertion location (IIL) is the number of the sentence after which the automatically generated text will be inserted. In another embodiment, the identifier is the number of the paragraph after which the automatically generated text will be inserted.

In an embodiment, Identifier of an Insertion Location 104 uses logical pauses, for example, the end of a sentence, the end of a paragraph, or the end of a chapter, within the text of the lecture to identify an insertion location (IL). In an embodiment, the logical pauses are identified by the presence of one or more characters representing a dot, a new line or a carriage return. In an embodiment, a logical pause is selected as an insertion location using a pseudo-randomization algorithm. In another embodiment, a logical pause is selected after a certain number of characters of a certain type, for example, dots, after the previous insertion location. In another embodiment, a logical pause is selected after an estimated time it would take the selected narrator to narrate text from the previous insertion point to the nearest dot character, for example, by generating a narration of the text from the previous insertion point to the nearest following dot character and measuring the time of the generated narration.

In an embodiment, the Identifier of an Insertion Location 104 uses a trained neural network to identify at least one insertion location IL within the text of a lecture. The neural network can be trained, for example, using AB testing when automatically generated fragments of different types are inserted at different points in the text of the lecture and the results of student's comprehension are evaluated by creating an effectiveness score, for example, by testing students' knowledge of the subject or by asking them questions after the lecture or by testing it in some other way wherein the effectiveness score is the number of points that the student scored during testing, or by observing how many students fell asleep or stopped following the narration of the lecture with the group of students participating in the testing experiment, wherein the effectiveness score is reverse proportional to the number of students that fell asleep or stopped following the narration of the lecture in the group of students participating in the testing experiment.

In an embodiment, generator module 106 determines the type of the automatically generated textual scenario (AGTS), for example, a question with no answer, a question with one or more correct answers, a question with one or more incorrect answers, a rhetorical question, a summary, or an exclamation, determines the length of the textual fragment of the lecture preceding the IL that will be used to generate the AGTS, generates the text of the automatically generated textual scenario (AGTS) that will be inserted in the narrated version of the lecture at the insertion location (IL) generated by Identifier of an Insertion Location 104 as well as characteristics of voice and avatar of one or more narrators of the AGTS. Accordingly, generator module 106 is also referred to herein as GAGTS (generator of the AGTS) In an embodiment, the type of AGTS also determines the number of fragments that the individual AGTS will comprise, each assigned a different textual string, voice characteristic of the narrator, and avatar of the narrator. In an embodiment, generator module 106 is substantially similar to generator module 60.

In an embodiment, GAGTS 106 takes as input the IL value produced by Identifier of an Insertion Location 104. Using the IL value, GAGTS 106 creates one AGTS for the IL.

In an embodiment, the Identifier of an Insertion Location 104 generates more than one IL. Accordingly, GAGTS 106 can receive as input a plurality of IL values and create an AGTS for each of the plurality of IL values.

In an embodiment, AGTS comprises one or more fragments. Each fragment is assigned at least three attributes: a textual string, a digital characteristic of the voice of the narrator of the fragment, and a digital characteristic of the avatar of the narrator of the fragment.

In an embodiment, the GAGTS 106 saves attributes related to each AGTS to computer memory or a computer file to an array or collection of AGTS objects, wherein each AGTS is assigned an object with structure comprising the following values: IL, type of AGTS to be generated, the length of the textual fragment (LTF) of the lecture preceding the IL that will be used to generate the AGTS, as well as an array or collection comprising objects describing each fragment comprising the number indicating the sequential number of the fragment within the AGTS, generated text of the fragment, characteristics of the voice for narration of the text of the fragment, as well as avatar characteristics for the narration of the text of the fragment. In an embodiment, the number indicating the sequential number of the fragment within the AGTS is omitted, and the sequence of the fragments is determined by the order of fragments is determined by their indices within the array or collection of fragment characteristics stored in computer memory or a file.

In an embodiment, the automatically generated textual scenario (AGTS) is selected from a plurality of predefined scenarios, wherein each scenario is assigned a data structure saved in computer memory or a file comprising the text of the scenario, characteristics of the voice of the narrator for the scenario, as well as characteristics of the avatar of the narrator for the scenario. In an embodiment, individual data objects for each scenario are stored in an array or a collection stored in computer memory or a file. In an embodiment, that selection of automatically generated textual scenarios AGTS is pseudo-random based on a software implementation of a pseudo-random algorithm from a predefined set of textual scenarios. In an embodiment, selected textual scenarios are excluded from the predefined set of textual scenarios for the purpose of selection of the following AGTS. In another embodiment, automatically generated textual scenarios AGTS are selected in a predefined order from a predefined set of textual scenarios.

In an embodiment, in the case when AGTS are selected from an array or a collection of predefined scenarios stored in computer memory or in a file, GAGTS 106 stores in a computer memory or a file an array or collection of objects, one object per AGTS, each comprising an IL and the unique identifier of the predefined scenario from the array or a collection of scenarios assigned to the IL.

In an embodiment, the automatically generated textual scenario (AGTS) is generated using linguistic analysis of the textual context of the lecture around the insertion location IL. In an embodiment, the text of a paragraph is used as input into a summarization program (not depicted in FIG. 1B) to produce a one-sentence summarization of the paragraph. In an embodiment, the question is generated using a question generation tool (not depicted in FIG. 1B) and the summarization of the paragraph as a prompt for that tool. Finally, either pseudo-randomly or using a deterministic rule, an AGTS is selected. For example, the first fragment of the AGTS comprises a question that is, for example, the entire automatically generated textual scenario (AGTS) or a part of it, for example, by appending a fixed prefix such as "Now, let me ask you a question." or a suffix such as "Eh?" to the automatically generated question.

In an embodiment, the automatically generated textual scenario (AGTS) is generated using a trained neural network based on the textual context of the lecture around the insertion location IL. In an embodiment, a neural network is a part of a natural language processing system that allows for prompts that generate both a question and the answer to that question. For example, a natural language processing subsystem can generate a question/answer pair if prompted "Generate a question and correct answer to this text:" followed by the text of the paragraph in quotation marks. In an embodiment, the results of the natural language processing subsystem is used as the text for the automatically generated textual scenario (AGTS).

In an embodiment, the textual content of the automatically generated textual scenario (AGTS) comprises a sentence agreeing with the opinion of the lecturer generated based on the textual context or from a plurality of previously selected agreeing sentences, for example, by the the GAGTS 106 submitting a prompt to a natural language processing subsystem based on a Large Language Model (LLM) that starts with "Form a sentence agreeing with the phrase" followed by the selected sentence or a group of sentences in quotation marks. In an embodiment, the result of the prompted LLM 112 is communicated to GAGTS 106 and used as the textual context of the AGTS.

In an embodiment, the textual context of the automatically generated textual scenario (AGTS) comprises a rhetorical question generated based on the textual context, for example, by submitting a prompt to a natural language processing subsystem based on a Large Language Model (LLM) that starts with "Form a rhetorical question for the phrase" followed by the selected sentence or a group of sentences in quotation marks. In an embodiment, the result of the prompted LLM 112 is communicated to GAGTS 106 and used as the textual context of the AGTS. In an embodiment the rhetorical question is selected by GAGTS 106 from an array or a collection of previously selected rhetorical questions located in computer memory or a file.

In an embodiment, the textual context of the automatically generated textual scenario (AGTS) comprises a clarifying question generated based on the previous or following textual context followed by the narrator's avatar providing an answer to that question, for example, by submitting a prompt LLM 112 that starts with "Form a clarifying question for the phrase" followed by the selected sentence or a group of sentences in quotation marks. In an embodiment, the result of the prompted LLM 112 is communicated to GAGTS 106 and used as the textual context of the AGTS.

In an embodiment, the textual context, voice and avatar characteristics assigned of the automatically generated textual scenario (AGTS) comprises two fragments wherein the first fragment comprises an incorrect summary of the textual context, for example, by using the textual context preceded with a phrase "provide incorrect summary of the following fragment" submitted as a part of the prompt LLM 112, generated based on the textual context, for example, of the paragraph immediately preceding the insertion point, with assigned voice and avatar characteristics different from the voice and avatar of the narrator of the lecture; and the second fragment comprises the repetition of summarized material with the voice and avatar characteristics of the narrator of the lecture. In an embodiment, the incorrect summary of the fragment of lecture is generated by submitting a prompt to LLM 112 that starts with "Form an incorrect summary of the phrase" followed by the selected sentence or a group of sentences in quotation marks. In an embodiment, the result of the prompted LLM 112 is communicated to GAGTS 106 and used as the textual context for the first fragment of the AGTS.

In an embodiment, the textual context of the automatically generated textual scenario (AGTS) comprises a question asked by the lecturer followed by an answer by another student's avatar generated based on the textual context or from a plurality of previously selected questions and answers. In an embodiment, the question is generated by submitting a prompt to LLM 112 that starts with "Form a question to the phrase" followed by the selected sentence or a group of sentences in quotation marks, wherein the sentence or a group of sentences in the quotation marks are defined by the IL that denotes the end of the quoted fragment and the length of the textual fragment of the lecture preceding the IL that will be used to generate the AGTS. In an embodiment, the result of prompted LLM 112 is communicated to GAGTS 106 and used as the textual context for the first fragment of the AGTS, wherein the textual fragment of the lecture of the length (FTL) preceding the IL is used as textual context for the second fragment of AGTS and voice and avatar characteristics of the narrator of the lecture are used as voice and avatar characteristics of the second fragment of AGTS.

In an embodiment, the parameters of voice and avatar characteristics to narrate the automatically generated textual scenario AGTS are selected from a pre-set array or a collection of sets of parameters stored in computer memory or a file.

The narration module NM 108 is configured with access to computer memory or a file comprising the text of the lecture, characteristics of voice and avatar for the narrator of the lecture, as well as to the array or collection of objects comprising characteristics of individual automatically generated textual scenarios (AGTS). NM 108 is configured to create video fragments by narrating textual strings using specified voice and avatar characteristics. NM 108 is further configured to concatenate video fragments. In an embodiment, video fragments are separated from each other by pauses of predefined length. In an embodiment, NM 108 is substantially similar to narration module 62.

NM 108 is configured to create a narrated video using the fragment of lecture from the first character to the IL(1) and audio and avatar characteristics of the narrator of the lecture to form video lecture fragment VLF(0). In an embodiment, NM 108 is configured to first create an empty VLF data structure for subsequent population of VLF(n) fragments. Such creation of an empty to-be-populated data structure is beneficial for processing efficiency due to the ability to build the structure at a convenient processing time when data does not need to be initialized within the structure.

NM 108 is further configured to, for each i from 1 to n, wherein n is the total number of automatically generated textual scenarios AGTS, for each fragment F(i;j) for each j from 1 to m(i), wherein m(i)≥1 is the number of fragments for AGTS(i), generate a narration using the text of the fragment F(i;j), as well as voice and avatar characteristics of the fragment F(i;j) stored in the array or collection of AGTS characteristics by GAGTS 106 and concatenate video fragments VF(i:j) for each j from 1 to m(i) to form the video fragment VF(i) corresponding to AGTS(i).

NM 108 is further configured to, for each i from 1 to n−1, create a video lecture fragment VLF(i) using the text of the lecture from the character number LI(i)+1 to LI(i+1) and voice and avatar characteristics of the narrator of the lecture.

NM 108 is further configured to, for each fragment F(n;j) of each j from 1 to m(n), wherein m(i)≥1 is the number of fragments for AGTS (n), generate a narration using the text of the fragment F(n;j), as well as voice and avatar characteristics of the fragment F(n;j) stored in the array or collection of AGTS characteristics by GAGTS 106 and concatenate video fragments VF(n:j) for each j from 1 to m(n) to form the video fragment VF(n) corresponding to AGTS (n).

NM 108 is further configured to create a video lecture fragment VLF(n) using the text of the lecture from the character LI(n−1)+1 to the last character of the lecture using the voice characteristics and avatar characteristics of the narrator of the lecture.

NM 108 is further configured to concatenate video fragments VLF(0), VN(1), VLF(1), VN(2), VLF(2), . . . , VN(n), and VLF(n) to form the narrated video of the lecture (NVL) and save the concatenated video to computer memory or file system as one or more files.

The operator terminal OT 110, for example, a personal computer, a notebook, a laptop, or a smart phone capable of presenting audio and video to the user, presenting video via, for example, a screen or a projector, and audio via, for example, loudspeakers or headphones, is configured to have access to computer memory or file system where NVL is stored, and to present the NVL to the operator. In an embodiment, interface module 64 is configured to provide an interface for display by OT 110.

Accordingly, NM 108 improves video fragment storage. Storage of a plurality of fragments as described herein by concatenation saves storage space because the same plurality of fragments stored individually can generally take more storage space than the concatenated result due to metadata, memory allocation, etc. Further, NM 108 is configured to selectively re-encode as part of the concatenation. For example, instead of re-encoding all inputs, NM 108 can re-encode only the inputs that do not match such that the fragments share the same codec and other parameters. Accordingly, formatting processing and time is improved.

In an embodiment, the operator of OT 110 is a student user. In another embodiment, the operator of OT 110 is an employee user.

In an embodiment, the operator terminal OT 110 is further configured (e.g. by interface module 64) to solicit and gather feedback from the operator related to the effectiveness of the NVL.

In an embodiment, the feedback is solicited, administered and gathered using, for example, a web browser accessible in a computational device, computer terminal, or smartphone of OT 110, by administering a test to evaluate the comprehension of the operator of the contents of the narrated lecture with inserted one or more narrated automatically generated textual scenarios AGTS.

In an embodiment, the feedback is solicited, administered and gathered using, for example, a web browser accessible by OT 110, in the form of requesting the operator to fill out a feedback form evaluating the narrated lecture with inserted one or more narrated automatically generated textual scenarios AGTS.

In an embodiment, the gathered feedback from one or more operators is used to optimize the insertion locations, the contents of the automatically generated textual scenarios, or the properties of the voice or avatar to maximize the expected results of the feedback of the operators. AB testing is a process where NVLs are generated using different sets of parameters such as the number of insertions, types of AGTS, the length of the textual fragment of the lecture preceding the IL that is used to generate the AGTS, voice characteristics of the narrator of the lecture, avatar characteristics of the narrator of the lecture, as well as voice characteristics and avatar characteristics used to generate narrations of individual video fragments F(i:j). Such NVLs with different sets of parameters are displayed to operators. Feedback from demonstration of these NVLs with different sets of parameters is gathered for each operator. In one example, a threshold number of tests are evaluated and when the threshold is not met, the testing can be iterated with at least one change to a parameter of the NVL. In one example, a threshold number of tests comprises a value that reflects the results such that linear regression can be performed. If linear regression cannot be performed, the threshold is not met. In an embodiment, NM 108 can further comprise a record keeping sub-module for implementation of the feedback loop and storage of the results of the feedback loop. Feedback loop application in this way thereby improves machine learning, and particularly, linear-regression-type of supervised machine learning.

In an embodiment, NM 108 can further comprise an optimization sub-module configured to implement the linear optimization. In an embodiment, a set of parameters is selected using, for example, linear regression, to yield the maximum test result based on the iterated feedback loop. In one aspect, linear regression can be used to fit a predictive model to an observed data set of values of the response (e.g. feedback) and explanatory variables (NVLs with different sets of parameters). After developing such a model, if additional values of the explanatory variables are collected without an accompanying response value, the fitted model can be used to make a prediction of the response to maximize the effectiveness of the NVL according to one or more scoring values of the linear regression. Effectiveness is maximized according to the linear regression prediction of one or more explanatory variables to predict one response variable. The volume of different sets of parameters and complexity of calculations cannot be performed manually.

Figure 2:
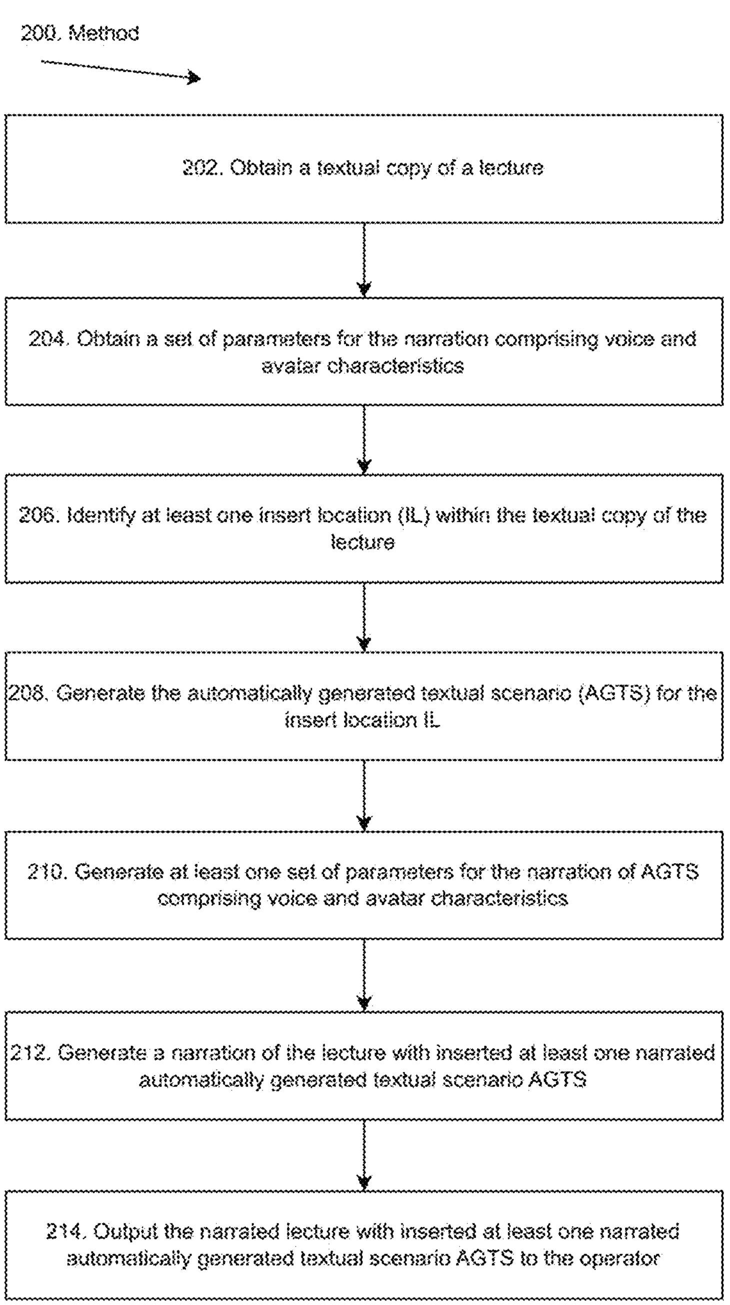
FIG. 2 is a flow diagram of a method of augmenting a narrated lecture, in accordance with an embodiment.

FIG. 2 is a flowchart of a method 200 for augmenting a narrated lecture, in accordance with an embodiment.

In an embodiment, a textual copy of a lecture is obtained at 202 from a computer memory or file storage comprising one or more files. For example, a user can access electronic container 102 on system 50. In another example, Identifier of an Insertion Location 104 can access electronic container 102.

In an embodiment, a textual copy of a lecture is accessed at 202 on a computer storage location. For example, a user can access computer storage location comprising the electronic container 102 on system 50. In another example, Identifier of an Insertion Location 104 can access a computer storage location comprising the electronic container 102.

In an embodiment, a copy is typed by an operator using, for example, interface module 64 and saved to computer memory 54 or one or more files by the processor 52.

In an embodiment, a copy is generated using a speech recognition mechanism executed by, for example, the processor 52 from an audio recording or video recording of a lecture and saved to computer memory 54 or one or more files.

In an embodiment, a set of parameters comprising the voice and avatar characteristics of a lecturer are obtained at 204 from computer memory 54 or one or more files by, for example, the Narration Module 108.

In an embodiment, this set of parameters comprising the voice and avatar characteristics of a lecturer is selected from a plurality of pre-selected sets of the voice and avatar characteristics of a lecturer from computer memory 54 or one or more files by, for example, the Narration Module 108.

In an embodiment, this set of parameters comprising the voice and avatar characteristics of a lecturer is generated based on the characteristics of the student, for example, age, gender, country of origin, place of residence, or level of education by, for example, the Narration Module 108.

In an embodiment, Identifier of an Insertion Location 104 and GAGTS 106 form a single object with access to computer memory 54 or file system.

In an embodiment, a set of ILs is generated using a trained neural network of Identifier of an Insertion Location 104. In an embodiment, the voice and avatar characteristics of an AGTS are generated using a trained neural network within GAGTS 106.

In an embodiment, at least one insertion location (IL) is identified at 206 and saved to computer memory or a file.

In an embodiment, the IL is determined using the criteria comprising identification of logical pauses in the text of the lecture such as ends of a sentence, paragraph, or a chapter denoted by special characters.

In an embodiment, the IL is determined using a trained neural network utilized by, for example, the Identifier of an Insertion Location 104.

In an embodiment, AGTS is generated at 208 for the selected insertion location IL based on the textual fragment of the lecture preceding the IL of the the length of the textual fragment of the lecture preceding the IL, for example, on a full sentence or a full paragraph immediately preceding the IL.

In an embodiment, the textual contents of AGTS are determined using at least one textual fragment of the lecture following the insertion location IL, for example, a full sentence or a full paragraph immediately following the IL.

In an embodiment, the textual contents of an AGTS are determined by the GAGTS 106 using the linguistic analysis, for example, by formulating a query using a textual fragment of the lecture, for example, a paragraph or a sentence preceding or immediately following the IL corresponding to the AGTS to query an LLM, obtain a response from the LLM, and use the response to generate the textual context of at least one of the fragments of the given AGTS.

In an embodiment, the textual contents of an automatically generated textual scenario (AGTS) are determined by the GAGTS 106 using the previously trained neural network by submitting the contextual information of the lecture, for example, a paragraph or a sentence preceding or immediately following the IL corresponding to the AGTS as input to the neural network, wherein the neural network is trained on vectors comprising the contextual information of the lecture and textual contents of corresponding AGTS.

In an embodiment, the textual contents of an automatically generated textual scenario (AGTS) generated by GAGTS 106 comprises an agreeing phrase selected from a plurality of previously selected agreeing phrases, generated by a previously trained neural network, or by using a linguistic analysis.

In an embodiment, the contents of an automatically generated textual scenario (AGTS) generated by GAGTS 106 comprises a rhetorical question selected from a plurality of previously selected rhetorical questions, generated by a previously trained neural network, or by using a linguistic analysis.

In an embodiment, the contents of an automatically generated textual scenario (AGTS) generated by GAGTS 106 comprises a question by another student followed by the answer by the lecturer selected from a predefined list of questions and answers or generated by a previously trained neural network or by using a linguistic analysis.

In an embodiment, the contents of an automatically generated textual scenario (AGTS) generated by GAGTS 106 comprises a second avatar pronouncing a clarifying question generated based on the previous or following textual context generated, for example, using a trained neural network or linguistic analysis, followed by the narrator's avatar providing an answer to that question.

In an embodiment, the contents of an automatically generated textual scenario (AGTS) generated by GAGTS 106 comprises a second avatar pronouncing a clarifying question generated, for example, using a trained neural network or linguistic analysis, incorrectly summarizing the context generated based on the textual context and lecturer's avatar explaining the relevant part of the lecture again.

In an embodiment, a set of parameters comprising voice and avatar characteristics for the automatically generated textual scenario AGTS or several sets of such parameters, one for each of the fragments of AGTS, are generated 210 for the individual fragments of AGTS attributable to different characters by, for example, GAGTS 106.

In an embodiment, sets of parameters comprising voice and avatar characteristics for the automatically generated textual scenario AGTS or several sets of such parameters, one for each of the fragments of AGTS, are selected from a predefined plurality of sets of parameters by, for example, GAGTS 106.

In an embodiment, sets of parameters comprising voice and avatar characteristics for the automatically generated textual scenario AGTS or several sets of such parameters, one for each of the fragments of AGTS, are generated using a trained neural network either implemented within GAGTS 106 or implemented outside of GAGTS 106 and queried by GAGTS 106.

In an embodiment, sets of parameters comprising voice and avatar characteristics for the automatically generated textual scenario AGTS or several sets of such parameters, one for each of the fragments of AGTS, are selected by, for example, GAGTS 106 based on an operator's characteristics such as age, gender, country of origin, location of residence, or level of education.

In an embodiment, a narration of the lecture with inserted automatically generated textual scenarios AGTS is generated at 212 by the narration module 108 by converting by the Narration Module 108 textual contents of the lecture fragments between insertion locations IL using the selected characteristics of voice and avatar of the selected lecture narrator, and converting selected automatically generated scenarios AGTS or their fragments using the characteristics of voice and avatars selected for these scenarios or their fragments, and by concatenating by the Narration Module 108 narrated fragments of the lecture between the insertion locations IL with the narrated automatically generated textual scenarios AGTS inserted at corresponding insertion locations IL.

In an embodiment, the narrated lecture with at least one inserted narrated automatically generated scenario AGTS is presented to the operator by the Operator Terminal 110.

In an embodiment, the operator of the Operator Terminal 110 is a student user or an employee user.

In an embodiment, the presentation of the narrated lecture with at least one inserted narrated automatically generated scenario is followed by soliciting, administering, and gathering operator's feedback about the effectiveness of the lecture using the Operator Terminal 110.

In an embodiment the feedback is solicited, administered, and gathered using a test to assess the operator's comprehension of the material discussed in the lecture using the Operator Terminal 110.

In an embodiment, the feedback is solicited, administered, and gathered using a form to gather operator's satisfaction with the narrated lecture using the Operator Terminal 110.

In an embodiment, the insertion locations IL, the content and the type, for example, a question, a question followed by an answer, or a summary of the preceding textual contents of the lecture, of the automatically generated textual scenarios AGTS, or parameters comprising characteristics of voices and avatars used in the narrated lecture with inserted AGTS, are determined by, for example, GAGTS 106, based on the results of feedback from the operator or characteristics to maximize at least one parameter in the feedback of the operator, for example, the testing score, level of satisfaction, number of times the lecture is paused by the operator, or the percentage of lecture completed by the operator.

The invention claimed is:

1. A method for augmenting a narrated lecture with narrated automatically generated textual scenarios, comprising:

accessing a text of the lecture in computer memory or within one or more files located on a file storage;

identifying n≥1 insertion locations IL(i) within the text of the lecture for i from 1 to n based on a predetermined insertion point identification criteria (PIPIC);

for each i from 1 to n, using a predetermined automatically generated textual scenario generation criteria (PAGTSGC), determining a length of a textual fragment LTF(i) of a lecture preceding or following the IL(i) to generate an automatically generated textual scenario AGTS(i);

performing the following operations, in any order:

creating an empty video lecture file VLF in the computer memory or in a file system, for each i from 1 to n, using the GAGTS, generating m(i)≥1 fragments, each fragment having a set of fragment parameters FP(i;j) comprising generated text, voice, and visual avatar characteristics, and saving the set of parameters FP(i;j) corresponding to AGTS(i) to an array of fragment parameters AFP(i) in the computer memory or file system, for each i from 1 to n, for each j from 1 to m(i), generating a video fragment VF(i;j) by using a narration of the text of the fragment F(i;j) with the voice and visual avatar characteristics of the fragment F(i;j) stored in the array of fragment parameters AFP(i) and concatenating the video fragments VF(i:j) for a given i and j from 1 to m(i) to form a video VAGTS(i) of the AGTS(i) and saving the VAGTS(i) in the computer memory or file system, concatenating VAGTS(1) to the VLF, for each i from 1 to n−1, creating a narrated video using a fragment of the lecture from the character number LI(i)+1 to LI(i+1) and the characteristics of audio and video avatar of a narrator of the lecture to create video lecture fragment VLF(i), and concatenating VLF(i) to the computer memory or file system, concatenating VAGTS(i) to the VLF, and creating a narrated video using a fragment of the lecture from the character number IL(N)+1 to a last character of the text of the lecture and the voice and video avatar characteristics of the narrator of the lecture to create video lecture fragment VLF(n) and concatenate VLF(n) to the VLF in the computer memory or file system;

assigning the value of fragment VLF(0) to the narrated video of the lecture NVL(0);

for each i from 1 to n, assigning the NVL(i) the value of concatenated NVL(i−1)+VN(i)+VLF(i);

saving NVF(n) to the computer memory or file system as one or more files as the narrated video of the lecture NVL; and communicating the NVL to at least one operator at a computing device.

2. The method of claim 1, wherein the predetermined insertion point identification criteria PIPIC is generated by:

training a machine learning model using a training set comprising a plurality of lectures and identified at least one insertion point within the lecture; and using the trained machine learning model to identify at least one insertion point within the lecture.

3. The method of claim 2, wherein the at least one insertion point is identified by the machine learning model by evaluation of an effectiveness score of testing on the lecture.

4. The method of claim 1, wherein the predetermined automatically generated textual scenario generation criteria PAGTSGC is generated by:

training a machine learning model using a training set comprising a plurality of sets each comprising a lecture, an insertion location, and an inserted one automatically generated textual scenario AGTS separated into fragments and at least one set of audio characteristics and visual avatar characteristics for each fragment of the automatically generated textual scenario AGTS.

5. The method of claim 1, further comprising determining at least one IL within the text of the lecture by determining a logical pause in the text of the lecture denoted by a corresponding character or a set of characters.

6. The method of claim 1, wherein at least one fragment of the automatically generated textual scenario AGTS comprises a text that is an agreeing phrase, either automatically generated based on a textual context or from a plurality of previously selected agreeing phrases, and voice and visual avatar characteristics different from voice and visual avatar characteristics of the narrator of the lecture.

7. The method of claim 1, wherein at least one fragment of the automatically generated textual scenario AGTS comprises a text that is a rhetorical question generated based on a textual context or from a plurality of previously selected rhetorical questions, and voice and visual avatar characteristics different from voice and visual avatar characteristics of the narrator of the lecture.

8. The method of claim 1, wherein the generated text of the first fragment of the automatically generated textual scenario AGTS comprises a text that is a clarifying question generated based on a previous or following textual context with voice and visual avatar characteristics different from the voice and visual avatar characteristics of the narrator of the lecture followed by another fragment with characteristics comprising the text of the answer and voice and video avatar characteristics of the narrator of the lecture.

9. The method of claim 1, wherein the generated text of at least one fragment of the automatically generated textual scenario AGTS comprises a text comprising an incorrect summarizing of a fragment of the lecture and voice and visual avatar characteristics different from the voice and avatar characteristics of the narrator of the lecture, and another fragment of the same AGTS comprises a text that is a repetition the fragment that incorrectly summarized, and visual avatar characteristics of the narrator of the lecture.

10. The method of claim 1 further comprising:

generating a plurality of observations to optimize narration of the lecture, including:

generating a version of the NVL with PIPIC and PAGTSGC values, showing the generated version of the NVL to at least one operator, assessing the effectiveness of showing the generated NVL to the at least one operator using an effectiveness score, saving the generated versions of PIPIC and PAGTSGC and the effectiveness score of showing the generated NVL, checking if a threshold number of tests have been performed and when the threshold number of tests have not been performed, changing at least one of the PIPIC or PAGTSGC and repeating the generating, showing, assessing, saving, and checking;

using a mathematical linear optimization, selecting the values of PIPIC and PAGTSGC that maximize the effectiveness score; and generating a version of NVL using PIPIC and PAGTSGC using the selected values of PIPIC and PAGTSGC that maximize the effectiveness score.

11. A system for augmenting a narrated lecture with automatically generated narrated video fragments, comprising:

an electronic container configured to store a text of the lecture in computer memory or a file system;

at least one processor and memory operably coupled to the at least one processor;

instructions that, when executed by the at least one processor, cause the at least one processor to implement:

an identifier of the insertion location (IIL) configured to access to the electronic container and to use a predetermined insertion point identification criteria (PIPIC) to identify at least one insertion location (IL) within the text of the lecture and to save the IL to the computer memory or file system;

a generator of automatically generated textual scenarios (GAGTS) configured to access to the electronic container and the at least one IL and generate for each of the identified insertion locations IL, using a predetermined automatically generated textual scenario generation criteria (PAGTSGC), an automatically generated textual scenario AGTS, wherein each ATGS comprises at least one fragment with a corresponding textual fragment, voice characteristics, and visual avatar characteristics;

a narration module (NM) configured to access the voice and visual avatar characteristics of all ATGS and to generate a narrated video of the lecture (NVL) using the voice and visual avatar characteristics, and further configured to:

create an empty video lecture file VLF in the computer memory or in a file system, for each i from 1 to n, wherein n is the number of generated AGTS, for each j from 1 to m(i), generating a video fragment VF(i;j) by using a narration of the text of the fragment F(i;j) with the voice characteristics and the visual avatar characteristics of the fragment F(i;j) and store video fragment VF(i:j) in the computer memory or file system, for each i from 1 to n, concatenate video fragments VF(i:j) for each j from 1 to m(i) to form the video fragment VF(i) corresponding to AGTS(i) and store video fragment VF(i) in the computer memory or file system, create a narrated video using a fragment of lecture from a first character to the IL(1) and the voice and visual avatar characteristics of a narrator of the lecture to create video lecture fragment VLF(0) and save VLF(0) to the computer memory or file system, for each i from 1 to n−1 create a narrated video using a fragment of the lecture from from the character number LI(i)+1 to LI(i+1) and the voice characteristics and the visual avatar characteristics of the narrator of the lecture to create video lecture fragment VLF(i) and save VLF(i) to the computer memory or file system, create a narrated video using a fragment of the lecture from the character number IL(N)+1 to a last character of the text of the lecture and the voice characteristics and the visual avatar characteristics of the narrator of the lecture to create video lecture fragment VLF(n) and save VLF(n) to the computer memory or file system;

assigning VLF(n) to the NVL; and an operator terminal configured to present the NFL to an operator.

12. The system of claim 11, wherein the predetermined insertion point identification criteria PIPIC is generated by:

training a machine learning model using a training set comprising a plurality of lectures and identified at least one insertion point within the lecture; and using the trained machine learning model to identify at least one insertion point within the lecture.

13. The system of claim 12, wherein the at least one insertion point is identified by the machine learning model by evaluation of an effectiveness score of testing on the lecture.

14. The system of claim 11, wherein the predetermined automatically generated textual scenario generation criteria PAGTSGC is generated by:

training a machine learning model using a training set comprising a plurality of sets each comprising a lecture, an insertion location, and an inserted one automatically generated textual scenario AGTS separated into fragments and at least one set of audio characteristics and visual avatar characteristics for each fragment of the automatically generated textual scenario AGTS.

15. The system of claim 11, wherein the IIL is further configured to determine a logical pause in the text of the lecture denoted by a corresponding character or a set of characters.

16. The system of claim 11, wherein the GAGTS is further configured to generate an AGTS with at least one fragment comprising a text that is an agreeing phrase, either automatically generated based on a textual context or from a plurality of previously selected agreeing phrases, and having voice and visual avatar characteristics different from voice and visual avatar characteristics of the narrator of the lecture.

17. The system of claim 11, wherein the GAGTS is further configured to generate an AGTS with at least one fragment with characteristics comprising a text that is a rhetorical question generated based on a textual context or from a plurality of previously selected rhetorical questions, and voice and visual avatar characteristics different from voice and visual avatar characteristics of the narrator of the lecture.

18. The system of claim 11, wherein the GAGTS is further configured to generate an AGTS with at least two fragments, wherein a first fragment comprises a clarifying question generated based on the previous or following textual context with voice and visual avatar characteristics different from the voice with visual avatar characteristics of the narrator of the lecture and a second fragment comprises an answer to the question with voice and visual avatar characteristics of the narrator of the lecture.

19. The system of claim 11, wherein the GAGTS is further configured to generate an AGTS with at least two fragments, a first fragment comprises a clarifying question incorrectly summarizing the context generated based on the textual context with voice and visual avatar characteristics different from the voice and visual avatar characteristics of the narrator of the lecture and a second fragment comprises text of the lecture that was incorrectly summarized in the first fragment with voice and visual avatar characteristics of the narrator of the lecture.

20. The system of claim 11 further comprising:

a record keeping module (RKM) configured to store PIPIC and PAGTSGC values, a set of user characteristics, and assessment results further configured to repeat the following actions:

generate version of NVL using a set of PIPIC and PAGTSGC values, show the generated version of the NVL to at least one operator, assess the effectiveness of showing the generated version of NVL to the at least one operator using an effectiveness score, save given PIPIC and PAGTSGC values, given a set of user characteristics and given assessment results to the computer memory or file;

checking if a threshold number of tests was performed to perform linear regression;

when the linear regression cannot be performed change at least one of the PIPIC or PAGTSGC parameters and repeat the all actions;

an optimization module (OM) configured to use linear regression to identify PIPIC and PAGTSGC parameters that maximize the effectiveness score of showing NVL to an operator with a particular set of characteristics.

* * * * *